Dec. 13, 1960
J. R. FARRON
2,964,018
ELECTRO-HYDRAULIC SERVO VALVE
Filed Dec. 27, 1957
3 Sheets-Sheet 1

INVENTOR.
JOHN R. FARRON
BY
ATTORNEY

Dec. 13, 1960  J. R. FARRON  2,964,018
ELECTRO-HYDRAULIC SERVO VALVE
Filed Dec. 27, 1957  3 Sheets-Sheet 2

INVENTOR.
JOHN R. FARRON
BY
ATTORNEY

Dec. 13, 1960     J. R. FARRON     2,964,018
ELECTRO-HYDRAULIC SERVO VALVE

Filed Dec. 27, 1957     3 Sheets-Sheet 3

INVENTOR.
JOHN R. FARRON
BY
ATTORNEY

United States Patent Office 2,964,018
Patented Dec. 13, 1960.

2,964,018

ELECTRO-HYDRAULIC SERVO VALVE

John R. Farron, Oak Park, Mich., assignor to The Bendix Corporation, a corporation of Delaware Filed Dec. 27, 1957, Ser. No. 705,635

10 Claims. (Cl. 121—41)

This invention relates to a two stage, spool-type, electro-hydraulic servo valve.

For certain applications, single stage, spool-type electro-hydraulic servo valves are entirely satisfactory. However, for other applications such single stage valves are not practical because of the high electrical power requirements, unreliability and poor performance and, therefore, it becomes necessary to use a two stage valve having a pilot stage and a power stage controlled by the pilot stage. Two stage valves presently available are considerably more expensive to manufacture than the single stage valves because of their complexity and added close tolerance requirements.

This invention provides an improved two stage, spool-type electro-hydraulic servo valve which requires no added close tolerances over that required by a single stage, spool-type electro-hydraulic servo valve and is, therefore, considerably less expensive to manufacture than presently available two stage valves. It is very simple in construction and extremely reliable in its operation. In accordance with the invention, the pilot stage openings, through which fluid flow is to be controlled, are provided on the spool of the power stage at a position between the ends of the spool and a flapper member disposed externally of the spool is movable relative to the openings to control the fluid flow through and the pressure at the openings. This combination of features simplifies the valve greatly and makes it possible to manufacture it with the same tolerance requirements as a single stage valve.

An object of this invention is to provide an improved spool-type, two stage electro-hydraulic servo valve for controlling the flow of fluid to a fluid device.

A further object is to provide a valve of the above character which can be manufactured with no added close tolerance requirements over a similar single stage valve and which is simple in construction and reliable in its operation.

Other objects and advantages will be apparent from the following detailed description of the invention and from the appended drawings and claims.

Figures 1, 2:
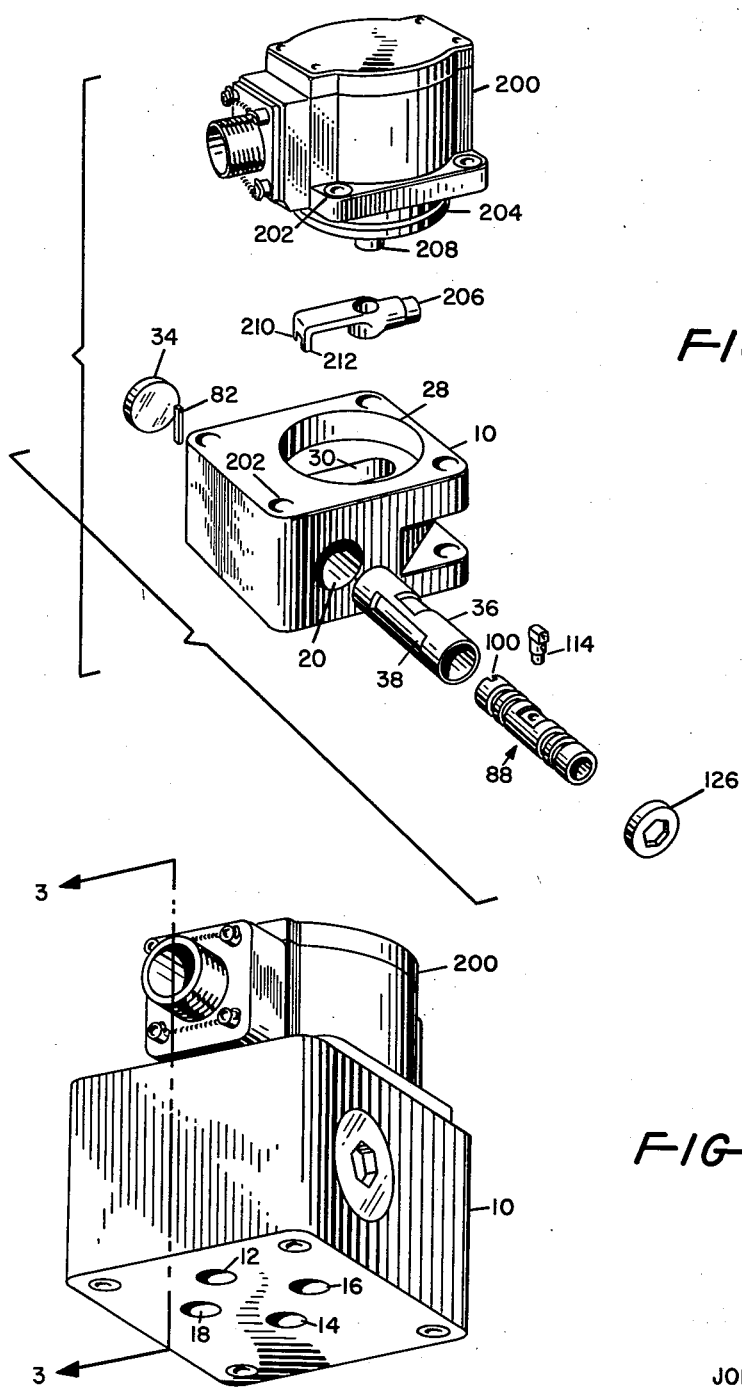
Figure 1 is a perspective view of a servo valve which embodies the features of this invention.
Figure 2 is an exploded view of the servo valve in Figure 1 showing its component parts in disassembled relationship.

In Figure 1, a valve housing 10 is provided with a pressure port 12, an exhaust port 14 and ports 16 and 18 for connection to any fluid device (not shown) which is to be actuated. The ports 12, 16 and 18 extend upward into the housing 10 and communicate with a cylindrical opening 20 extending through the housing. The exhaust port 14 also extends into the housing 10 and communicates with a hole 22 in the housing which is substantially parallel to the opening 20 in the housing. The opposite ends of the hole 22 communicate with the opening 20 through ports 24 and 26.

Provided at the top of the housing 10 is an annular groove 28 and a further groove 30. The groove 30 communicates with the opening 20 by means of an opening 32. A plug 34 is screwed into one end of the opening 20 to block the opening at that end and a sleeve 36 is inserted into the opening 20 and is retained against the plug 34. The sleeve 36 is provided with a groove 38 which through slots 40 and 42 communicates with annular grooves 44 and 46 provided in the inner surface of the sleeve.

The sleeve 36 is also provided with grooves 48 and 50. Slots 52 and 54 connect the groove 48 to annular grooves 56 and 58 in the inner surface of the sleeve and slots 60 and 62 connect the groove 50 to annular grooves 64 and 66 in the sleeve. The sleeve 36 is further provided with grooves 68 and 70. A slot 72 connects the groove 68 to an annular groove 74 in the sleeve 36 and a slot 76 connects the groove 70 to annular groove 78 in the sleeve.

The end of the sleeve 36 retained against the plug 34 is provided with a pair of grooves 80 for receiving a key 82. O rings 83 are inserted into annular grooves 84 provided at both ends of the sleeve 36. An opening 86 in the sleeve 36 is aligned with the opening 32 in the groove 30.

Disposed within the sleeve 36 is a spool 88 having a plurality of lands 90, 92, 94, 96 and 98. The land 90 is provided with grooves 100 into which the key 82 is received to prevent a rotational movement of the spool 88. Axial lines 102 and 104 extend through the spool 88 and communicate with chambers 101 and 103 defined on the opposite ends of the spool and also communicate with a hole 106 through the center of the spool between grooves 108 and 110 provided on the land 94. A plurality of fixed orifices 112 extend through the spool between the lands 92 and 94 and between lands 94 and 96 and communicate with the lines 102 and 104. A nozzle 114 fits snugly into the hole 106. The nozzle is provided with lines 116 and 118 which communicate with the lines 102 and 104, respectively. The lines 116 and 118 in turn communicate with openings 120 and 122 in the nozzle. The nozzle 114 is inserted into the hole 106 such that the nozzle top 124 is recessed below the outside surface of the land 94 so that the spool 88 can be inserted into the sleeve 36 without interference from the nozzle.

A plug 126 is inserted into the other end of the opening 20 to retain thte sleeve 36 and the spool 88 within the housing 10. Since the spool 88 is shorter than the sleeve 36, the spool may be displaced relative to the sleeve.

A torque motor 200 is fastened to the top of the housing 10 such as by screws through holes 202. A lower cylindrical portion 204 of the motor 200 is received within the groove 28 in the housing 10. A flapper 206 is snugly retained on a shaft 208 of the torque motor. The flapper 206 fits into the groove 30 and its arms 210 and 212 extend through the openings 32 and 86 for positioning adjacent to the openings 120 and 122 of the nozzle 114. The operation of torque motors similar to motor 200 is well known to persons skilled in the art. When a D.-C. signal is applied to the motor 200, its shaft 208 rotates an angular distance proportional to the signal. This causes a corresponding movement of the flapper 206 such that the arms 210 and 212 become linearly displaced relative to the openings 120 and 122. Any fluid flow through the openings 120 and 122 is restricted or metered in accordance with the distance of the arms 210 and 212 from the openings. Therefore, the openings 120 and 122 and the arms 210 and 212 with which they coact comprise the variable orifices of the pilot stage of the valve disclosed above.

In the operation of the servo valve disclosed above, fluid under relatively high pressure, such as oil at 3000 p.s.i., is introduced to the port 12. From the port 12, the fluid is introduced to the groove 38 in the sleeve 36 and from the groove 38 through slots 40 and 42 into the annular grooves 44 and 46. Some of the fluid in the grooves 44 and 46 is fed through the fixed orifices 112 in the spool 88 to the lines 102 and 104. From the line 102, the fluid passes through the line 116 of the nozzle 114 and passes out of the opening 120 into the groove 108. Similarly, the fluid from the line 104 passes through the line 118 and out of the opening 122, into the groove 108. The fluid in the lines 102 and 104 is also introduced to the chambers 101 and 103 at the opposite ends of the spool 108.

Figure 4:
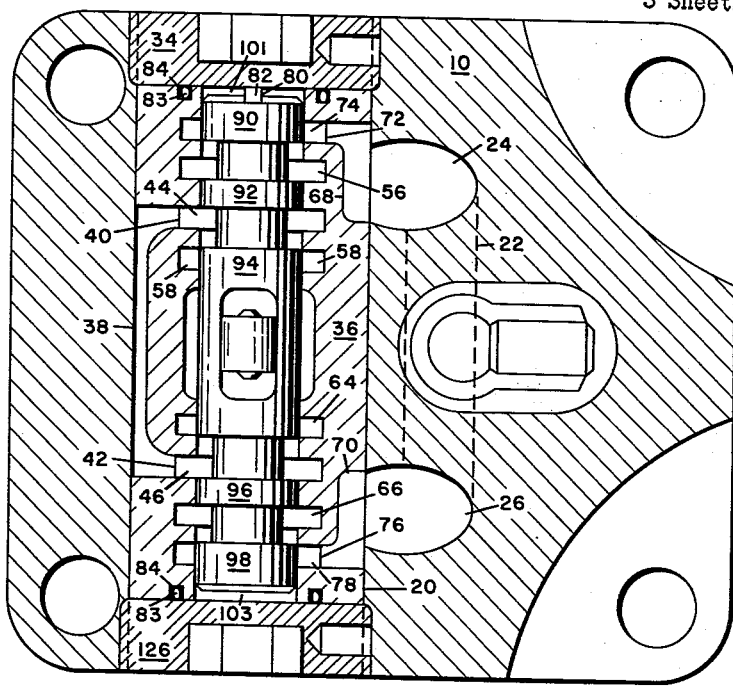
Figure 4 is a cross sectional view taken substantially at line 4—4 of Figure 3.
Figure 3:
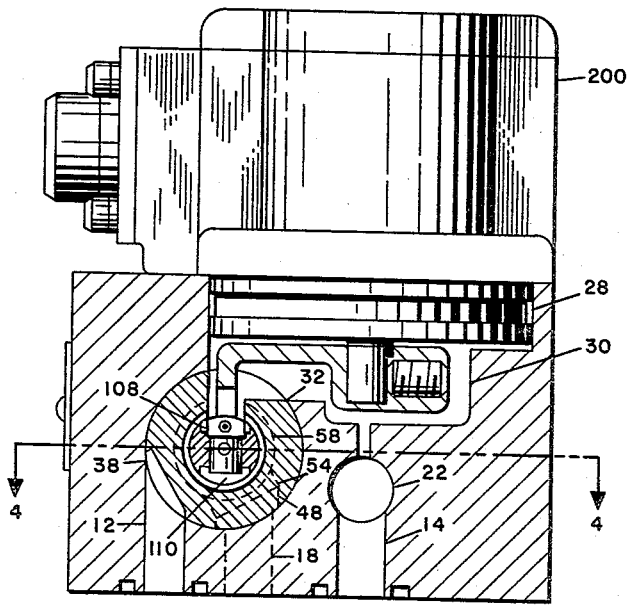
Figure 3 is a cross sectional view taken at substantially line 3—3 of Figure 1.
Figure 5:
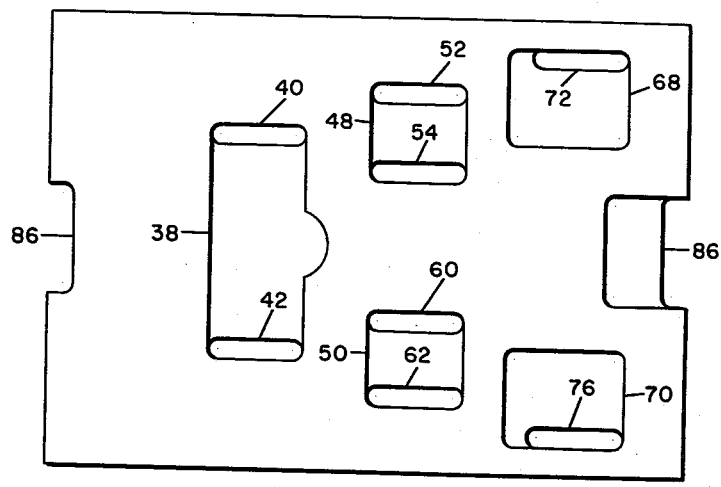
Figure 5 is a flattened view of one of the components shown in Figure 2.
Figure 6:
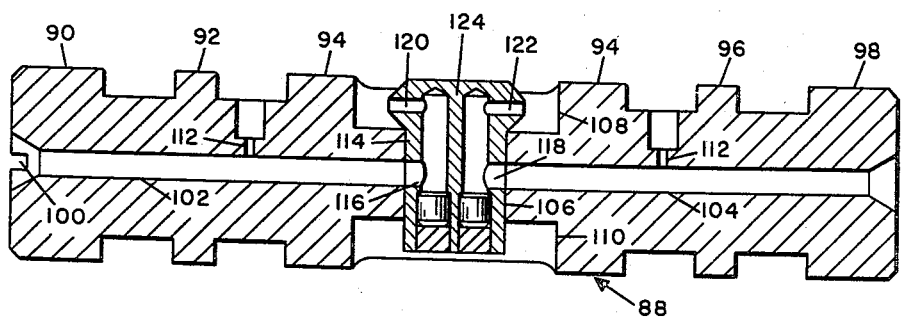
Figure 6 is a cross sectional view of certain other components shown in Figure 2.

When no signal is being applied to the torque motor 200, the flapper 206 and the spool 88 are maintained in their neutral or null position. In this position, the spool 88 is positioned relative to the sleeve 36 as shown in Figure 4 and the flapper arms 210 and 212 are positioned the same distance from the openings 120 and 122, respectively, thus producing the same fluid pressure at both openings. This results in equal pressures in the lines 102 and 104 and in the chambers 101 and 103 so that the spool is not displaced from its neutral position. With the spool 88 in its neutral position, no fluid flow through the valve can occur since the lands 92 and 94 block any fluid flow from the groove 44 into the grooves 56 or 58 and the lands 94 and 96 block any flow from the groove 46 into the grooves 64 and 66.

When a D.-C. signal is applied to the torque motor 200, the shaft 208 is rotated an angular distance proportional to the magnitude of the signal and in a direction dependent upon the polarity of the signal. This causes a corresponding movement of the flapper 206 and a proportionate displacement of the flapper arms 210 and 212 relative to the openings 120 and 122 in the nozzle 114. For example, a D.-C. signal of one polarity would rotate the shaft 208 in a counterclockwise direction as viewed from the top of Figure 2, thus causing the flapper arm 210 to move towards the opening 120 and the flapper arm 212 away from the opening 122. The amount the flapper arms are displaced relative to the openings would be proportional to the magnitude of the signal. As a result, the pressure at the opening 120 is increased and the pressure at the opening 122 is decreased. These pressures are transmitted to the chambers 101 and 103 through the lines 102 and 104, respectively, and the difference in pressure causes the spool 88 to be displaced downward in Figure 4. The spool 88 is displaced the same distance as the flapper arms to again position the arms 210 and 212 equidistant from the opening 120 and 122 and equalize the pressures at the openings and in the chambers 101 and 103. During application of the signal, the flapper and the spool remain in their displaced position.

In the displaced position of the spool 88, the land 94 is displaced to provide a communication between the grooves 44 and 58 in the sleeve 36 and the land 98 is displaced to provide a communication between the grooves 66 and 78 in the sleeve. This results in a fluid flow in a circuit including, the port 12, the groove 38, the slot 40, the groove 44, the groove 58, the slot 54, the groove 48, the port 18, through the fluid device (not shown), the port 16, the groove 50, the slot 62, the groove 66, the groove 78, the slot 76, the groove 70, the port 26, the hole 22 and finally to exhaust through port 14. Since the spool 88 is displaced an amount proportional to the magnitude of the signal applied to the torque motor 200, the fluid flow through the fluid device is also proportional to the signal. Upon removal of the signal, the shaft 208 returns the flapper to its neutral position. The resultant pressure differential produced at the openings 120 and 122 causes a return of the spool 88 to its neutral position to block any further flow through the fluid device. When a D.-C. signal of opposite polarity is applied to the motor 200, the spool 88 becomes displaced in an upward direction in Figure 4 and flow occurs through the fluid device in the opposite direction through a circuit symmetrical to that disclosed above.

The servo valve disclosed above has several advantages. By positioning the pilot stage openings 120 and 122 on the spool 88 at a position between the ends of the spool, and also by disposing the flapper 206 externally of the spool for movement relative to openings to control the flop through them, the valve can be produced with no more close tolerance than in a single stage, spool type servo valve. The close tolerances would be required only in connection with the spool lands 90, 92, 94, 96 and 98 and with the inner surface of the sleeve 36 with which the lands cooperate to control the fluid flow, the identical tolerances as required in a single stage valve. Therefore, the disclosed valve costs considerably less to manufacture than other two stage valves. Although it would be feasible to provide openings corresponding to 120 and 122 directly in the spool 88 as an integral part thereof instead of utilizing a separately fabricated nozzle 114, the use of the separate nozzle simplifies construction and further reduces the cost of manufacture. Furthermore, the valve is more reliable than those presently available because the close tolerances are kept to a minimum.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A two stage, spool type electro-hydraulic servo valve for introducing fluid under pressure to a fluid device upon displacement of its spool relative to its housing, including, a first line extending through the spool and communicating with a first chamber defined between one end of the spool and the housing, a second line extending through the spool and communicating with a second chamber defined between the opposite end of the spool and the housing, first and second openings in the spool and communicating with the first and second line respectively, the openings being positioned between the ends of the spool, means including at least one fixed orifice connected to the first line and at least one fixed orifice connected to the second line for introducing fluid to the first and second lines from the pressure inlet of the valve, a flapper disposed externally of the spool and positioned adjacent to and at an equal distance from the first and second openings, respectively, to maintain substantially constant the fluid pressures at the openings and in the first and second chambers, and means for displacing the flapper relative to the openings in accordance with an electrical signal to produce a difference in pressure at the openings and in the chambers to displace the spool relative to the housing a distance corresponding to the flapper displacement.

2. A servo valve as recited in claim 1 wherein the first and second openings in the spool are located midway between the ends of the spool.

3. A two stage, spool type electro-hydraulic servo valve for introducing fluid under pressure to a fluid device upon displacement of its spool relative to its housing, including, a hole extending through the spool in substantially perpendicular relationship to the axis of the spool, a first line in the spool connecting the hole to a first chamber defined between one end of the spool and the housing, a second line in the spool connecting the hole to a second chamber defined between the opposite end of the spool and the housing, a separately fabricated nozzle inserted into the hole extending through the spool, first and second openings in the nozzle communicating with the first and second lines of the spool in the inserted position of the nozzle, means including at least one fixed orifice connected to the first line and at least one fixed orifice connected to the second line for introducing fluid to the first and second lines from the pressure inlet of the valve, a flapper disposed externally of the spool and positioned adjacent to and at an equal distance from the first and second openings, respectively, to maintain substantially constant the fluid pressures at the openings and in the first and second chambers, and means for displacing the flapper relative to the openings in accordance with an electrical signal to produce a difference in pressure at the openings and in the chambers to displace the spool relative to the housing a distance corresponding to the flapper displacement.

4. A servo valve as recited in claim 3 wherein the hole extending through the spool is positioned midway between the ends of the spool.

5. A servo valve as recited in claim 3 wherein the separately fabricated nozzle is inserted into the spool such that the top of the nozzle and the first and second openings in the nozzle are recessed below the outside surface of the spool.

6. A servo valve as recited in claim 3 wherein the separately fabricated nozzle is inserted into the spool such that no portion of the nozzle protrudes above the outside surface of the spool.

7. A servo valve comprising a cylindrical housing, a spool mounted reciprocably in said housing, end chambers being defined between the spool ends and said housing, said spool having a mid position and being movable in either direction out of said mid position in response to different pressures in said end chambers, an opening means being in communication with each of said end chambers, connecting means being between each of said opening means and the corresponding end chamber, said opening means being transversely displaced from any longitudinal bores in said spool, a control means, said control means being movable toward and away from said opening means to vary the fluid flow and pressure in said opening means, said control means being movable in the direction of one of said opening means and at the same time movable in a direction away from the other of said opening means so that the pressure in one end chamber varies in an opposite manner from the pressure in the other end chamber to move said spool away from the high pressure end and towards the low pressure end, and means for moving said control means.

8. The servo valve of claim 7 wherein said opening means are movable with said spool, said connecting means comprises a pair of longitudinal bores in said spool, with one bore connecting one opening means to its corresponding end chamber and the other bore connecting the other opening means and its corresponding end chamber.

9. A servo valve comprising a cylindrical housing having load motor ports, a spool mounted reciprocably in said housing, said spool having lands, pressure and return chambers being defined by said lands and said housing and cooperating with said load motor ports, end chambers being defined between the spool ends, and said housing, said spool having a mid position in which said lands are correspondingly disposed with respect to said load motor ports and movable in either direction out of said mid position in response to different pressures in said end chambers to connect either load port to a pressure chamber and the other load port to a return chamber, an orifice means being in communication with each of said end chambers, said orifice means being external to any longitudinal bore in said spool, means for supplying controlled fluid flow to said orifices and end chambers, including a control member external to and movable independently of said spool and cooperating with said orifices, said member when symmetrically positioned relative to said orifices producing equal pressures in said two end chambers, and when asymmetrically positioned relative to said orifices producing unequal pressures in said end chambers urging said spool in the direction to restore said symmetrical positioning, and means for moving said control member.

10. A servo valve comprising a cylindrical housing, a spool mounted reciprocably in said housing, end chambers being defined between the spool ends and said housing, said spool having a mid position and being movable in either direction from said mid position in response to different pressures in said end chambers, a pair of opening means, said opening means being in a member fabricated separately from said spool, connecting means for connecting one of said opening means to one of said end chambers and connecting means for connecting the other of said openings to the other end chamber, control means, said control means being movable toward and away from said opening means to vary the fluid flow and pressure in said opening means, said control means being movable in the direction of one of said opening means and movable at the same time in a direction away from the other of said opening means so that the pressure in one end chamber varies in an opposite manner from the pressure in the other end chamber to move said spool away from the high pressure end and towards the low pressure end, and means for moving said control means.

References Cited in the file of this patent

UNITED STATES PATENTS

| | | |
|---|---|---|
| 2,269,072 | Wilde et al. | Jan. 6, 1942 |
| 2,526,709 | Tait | Oct. 24, 1950 |
| 2,824,574 | Place | Feb. 25, 1958 |
| 2,936,783 | Moffatt | May 17, 1960 |

FOREIGN PATENTS

| | | |
|---|---|---|
| 492,292 | Germany | Feb. 22, 1930 |
| 525,878 | Germany | June 4, 1931 |
| 910,115 | France | Jan. 21, 1946 |